United States Patent
Anifowose et al.

(10) Patent No.: US 11,512,580 B2
(45) Date of Patent: Nov. 29, 2022

(54) REAL-TIME ESTIMATION OF RESERVOIR POROSITY FROM MUD GAS DATA

(71) Applicant: Saudi Arabian Oil Company, Dhahran (SA)

(72) Inventors: Fatai A. Anifowose, Al Khobar (SA); Mokhles Mustapha Mezghani, Dhahran (SA); Walid K. Hussein, Dhahran (SA); Jean-Francois Mengual, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 284 days.

(21) Appl. No.: 16/871,813

(22) Filed: May 11, 2020

(65) Prior Publication Data
US 2021/0348495 A1 Nov. 11, 2021

(51) Int. Cl.
*E21B 47/00* (2012.01)
*G06N 20/00* (2019.01)
*G01V 99/00* (2009.01)
*G06K 9/62* (2022.01)

(52) U.S. Cl.
CPC ............ *E21B 47/00* (2013.01); *G01V 99/005* (2013.01); *G06K 9/6256* (2013.01); *G06K 9/6262* (2013.01); *G06N 20/00* (2019.01)

(58) Field of Classification Search
CPC .... E21B 47/00; G01V 99/005; G06K 9/6256; G06K 9/6262; G06N 20/00
See application file for complete search history.

(56) References Cited

U.S. PATENT DOCUMENTS

| 5,663,499 | A | 9/1997 | Semmelbeck et al. |
| 8,714,246 | B2 | 5/2014 | Pop et al. |
| 9,810,062 | B2 | 11/2017 | Akkurt et al. |
| 2013/0304679 | A1 | 11/2013 | Fleming |
| 2016/0231462 | A1* | 8/2016 | Ramsay ................. G06F 17/11 |

(Continued)

FOREIGN PATENT DOCUMENTS

| EP | 2772775 | 9/2014 |
| WO | 2005119303 | 12/2005 |

(Continued)

OTHER PUBLICATIONS

Melo, "Formation fluid prediction through gas while drilling analysis relationship between mud gas data and downhole fluid samples," Thesis to obtain Master of Science Degree in Petroleum Engineering, Tecnico Lisboa, Feb. 2016, 89 pages.

(Continued)

*Primary Examiner* — Mischita L Henson
(74) *Attorney, Agent, or Firm* — Fish & Richardson P.C.

(57) ABSTRACT

Systems and methods include a method for generating a real-time reservoir porosity log. Historical gas-porosity data is received from previously-drilled and logged wells. The historical gas-porosity data identifies relationships between gas measurements obtained during drilling and reservoir porosity determined after drilling. A gas-porosity model is trained using machine learning and the historical gas-porosity data. Real-time gas measurements are obtained during drilling of a new well. A real-time reservoir porosity log is generated for the new well using the gas-porosity model and real-time gas measurements.

20 Claims, 7 Drawing Sheets

(56) References Cited

U.S. PATENT DOCUMENTS

| | | | |
|---|---|---|---|
| 2016/0348480 A1* | 12/2016 | Zuo | ............................ E21B 47/10 |
| 2017/0260855 A1 | 9/2017 | Yang et al. | |
| 2017/0337302 A1 | 11/2017 | Mezghani et al. | |
| 2019/0112914 A1 | 4/2019 | Chen et al. | |
| 2019/0169986 A1 | 6/2019 | Storm et al. | |
| 2019/0392851 A1 | 12/2019 | Kim et al. | |
| 2020/0401951 A1 | 12/2020 | Ranganathan et al. | |
| 2021/0110280 A1 | 4/2021 | Akkurt et al. | |
| 2021/0310345 A1* | 10/2021 | Aqeel | .................... G06K 9/6267 |
| 2021/0349001 A1 | 11/2021 | Anifowose et al. | |

FOREIGN PATENT DOCUMENTS

| | | |
|---|---|---|
| WO | WO 2018208634 | 11/2018 |
| WO | WO 2019222129 | 11/2019 |

OTHER PUBLICATIONS

Yang et al., "A machine learning approach to predict gas oil ratio based on advanced mud gas data," SPE 195459, Society of Petroleum Engineers, Jan. 2019, 17 pages.

Zehui et al., "Permeability prediction with artificial neural network modeling in the venture gas field, offshore eastern Canada," Geophysics, Mar. 1996, 61(2):422-436, 16 pages.

PCT International Search Report and Written Opinion in International Appln. No. PCT/US2021/031534, dated Aug. 30, 2021, 18 pages.

PCT International Search Report and Written Opinion in International Appln. No. PCT/US2021/031538, dated Aug. 10, 2021, 13 pages.

Abouelresh, "Quantitative and Qualitative Evaluation of Micro-Porosity in Qusaiba Hot Shale, Saudi Arabia", 3rd Unconventional Resources Technology Conference, Jul. 2015, 10 pages.

Alakeely et al., "Application of Artificial Intelligence for Fluid Typing using Calibrated Compositional Data", 11th Middle East Geosciences Conference and Exhibition (GEO 2014), Mar. 2014, 25 pages.

Beda et al., "An Innovative Approach for Estimating the Sw and Porosity Using Gas and Mud Logging Data in Real Time", AAPG International Conference and Exhibition, Oct. 31, 2011, 17 pages.

Beda et al., "Gas While Drilling (GWD); A Real Time Geologic and Reservoir Interpretation Tool", SPWLA 40th Annual Logging Symposium, 1999, 14 pages.

Dashti et al., "Use of Advanced Mud Gas Chromatography for Reservoir Quality Prediction While Drilling", International Petroleum Technology Conference, Nov. 2016, 15 pages.

Dashti et al., "Use of Mud Gas Chromatograph for Reservoir Quality Prediction While Drilling—A Case Study", SPE Kuwait Oil and Gas Show and Conference, 2015, 17 pages.

Erzinger et al., "Real-time mud gas logging during drilling of the SAFOD Pilot Hole in Parkfield, CA", Geophysical Research Letters, Jun. 24, 2004, vol. 31, 4 pages.

Hammerschmidt et al., "Real-time drilling mud gas monitoring for qualitative evaluation of hydrocarbon gas composition during deep sea drilling in the Nankai Trough Kumano Basin", Geochemical Transactions, 2014, 15 pages.

Haworth et al., "Interpretation of Hydrocarbon Shows Using Light (C1-C5) Hydrocarbon Gases from Mud-Log Data", The American Association of Petroleum Geologists Bulletin, Aug. 1985, V. 69, No. 8, pp. 1305-1310.

Hurst et al., "Predicting Reservoir Characteristics From Drilling and Hydrocarbon-Gas Data Using Advanced Computational Mathematics", 2009 SPE Offshore Europe Oil & Gas Conference & Exhibition, Sep. 2009, 10 pages.

Monsen et al., "Quantitative 3D Outcrop Interpretation" SEG Technical Program Expanded Abstracts, 2006, 5 pages.

Saidian et al., "Qualitative and Quantitative Reservoir Bitumen Characterization: A Core to Log Correlation Methodology", 2014-SSSS SPWLA Conference Paper, 16 pages.

Zhao et al., "Estimating permeability of shale-gas reservoirs from porosity and rock compositions", GEOPHYSICS, vol. 83, No. 5, 2018, 12 pages.

Wikipedia.com [online], "Artificial neural network," available on or before May 2020, retrieved on May 10, 2020, retrieved from URL: <https://en.wikipedia.org/w/index.php?title=Artificial neural network &oldid=955889246>, 27 pages.

* cited by examiner

REAL-TIME ESTIMATION OF RESERVOIR POROSITY FROM MUD GAS DATA

BACKGROUND

The present disclosure applies to estimating reservoir porosity while drilling a well.

Conventional methodologies for reservoir evaluation typically require the acquisition of well logs after drilling is completed. Well logging acquisition programs and well data analysis usually take between one to four weeks after drilling is completed. In some cases, logging while drilling can be used. However, logging while drilling can have its own limitations, for example, due to lower data quality and expensive logging rates. For this reason, well logging remains being the usual way to determine reservoir quality.

Porosity logs provide an understanding of the productive and non-productive sections of a well. Combined with other logs, the porosity log gives an indication of whether a section of a well is composed of gas, oil, or water. The only available data during drilling is the mud log. Mud log is a volumetric measure of different gases that are liberated from the earth as the drill bit grinds through the rock formation during drilling.

Evaluation of the quality of a reservoir is a critical step in the petroleum reservoir development workflow. Evaluation is usually done after drilling is completed using specialized tools. Performing evaluation while drilling is possible through LWD and MWD methods but can be expensive. Logging processes can involve lowering a probe equipped with sensors into the drilled borehole. The probe can record data from the bottom of the borehole upwards until it reaches the surface. Recordings can include responses of rock formation to different signals, such as sound and radioactive materials. As a device such as a probe moves upward in the borehole, the device can continuously record a constant stream of data relating to the formation. The information can be digitally cataloged and presented in a standardized log spreadsheet.

Conventional uses of mud gas data in formation logging are typically limited to correlations of geological or petrophysical information, evaluation of wells, and formation fluid typing. Past attempts to extend the utility of mud gas data to characterize lithological changes, porosity variations, permeability barriers, gas/oil and hydrocarbon/water contacts, and vertical changes in fluid over a thick mono-layer pay zone are typically qualitative. Few attempts to utilize mud gas data have been limited to the use of only the lightest gas, methane (C1). More recent attempts use only the light hydrocarbon gases (C1 to C5) to predict reservoir fluid types using PVT data.

SUMMARY

The present disclosure describes techniques that can be used for generating real-time estimates of reservoir porosity from mud gas data while drilling. For example, the term real-time can correspond to events that occur within a specified period of time, such as within a few seconds or minutes. In some implementations, a computer-implemented method includes the following. Historical gas-porosity data is received from previously-drilled and logged wells. The historical gas-porosity data identifies relationships between gas measurements obtained during drilling and reservoir porosity determined after drilling. A gas-porosity model is trained using machine learning and the historical gas-porosity data. Real-time gas measurements are obtained during drilling of a new well. A real-time reservoir porosity log is generated for the new well using the gas-porosity model and real-time gas measurements.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, real-time reservoir porosity values can be combined with surface drilling parameters to determine reservoir quality and estimate reservoir rock strength. The information can be used, for example, to plan the well completion and stimulation processes. Also, knowing the reservoir porosity as drilling progresses can help drillers and wellsite geologists to identify target productive sections to use for multilateral drilling. Second, techniques described in the present disclosure can be used to solve the challenge of generating a porosity log while drilling for real-time and on-time decision-making. Third, productive and non-productive sections of a well can be identified. Fourth, real-time reservoir porosity values can be used in geo-steering, such as in horizontal and multilateral wells. For example, knowing the reservoir porosity while drilling can help drillers remain within the productive zone for maximum productivity. Fifth, permeability estimations can be improved, as real-time reservoir porosity values can be plugged in to permeability estimation models to obtain a real-time permeability log. Permeability estimates combined with porosity can provide a better indication of reservoir quality, reducing uncertainties that may occur when using only porosity as a reservoir quality indicator. Sixth, machine learning (ML) techniques can be used to establish a nonlinear relationship between mud gas measurements and porosity of existing wells to estimate the porosity log for a new well while drilling. The use of ML techniques can also overcome the limitations of static equations and basic statistics, such as Monte Carlo. Seventh, estimation of reservoir porosity can be improved by using both light (basic) and heavy (advanced) gas measurements in real-time and employing ML techniques to build sophisticated nonlinear relationships between gas measurements and their corresponding porosity values.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
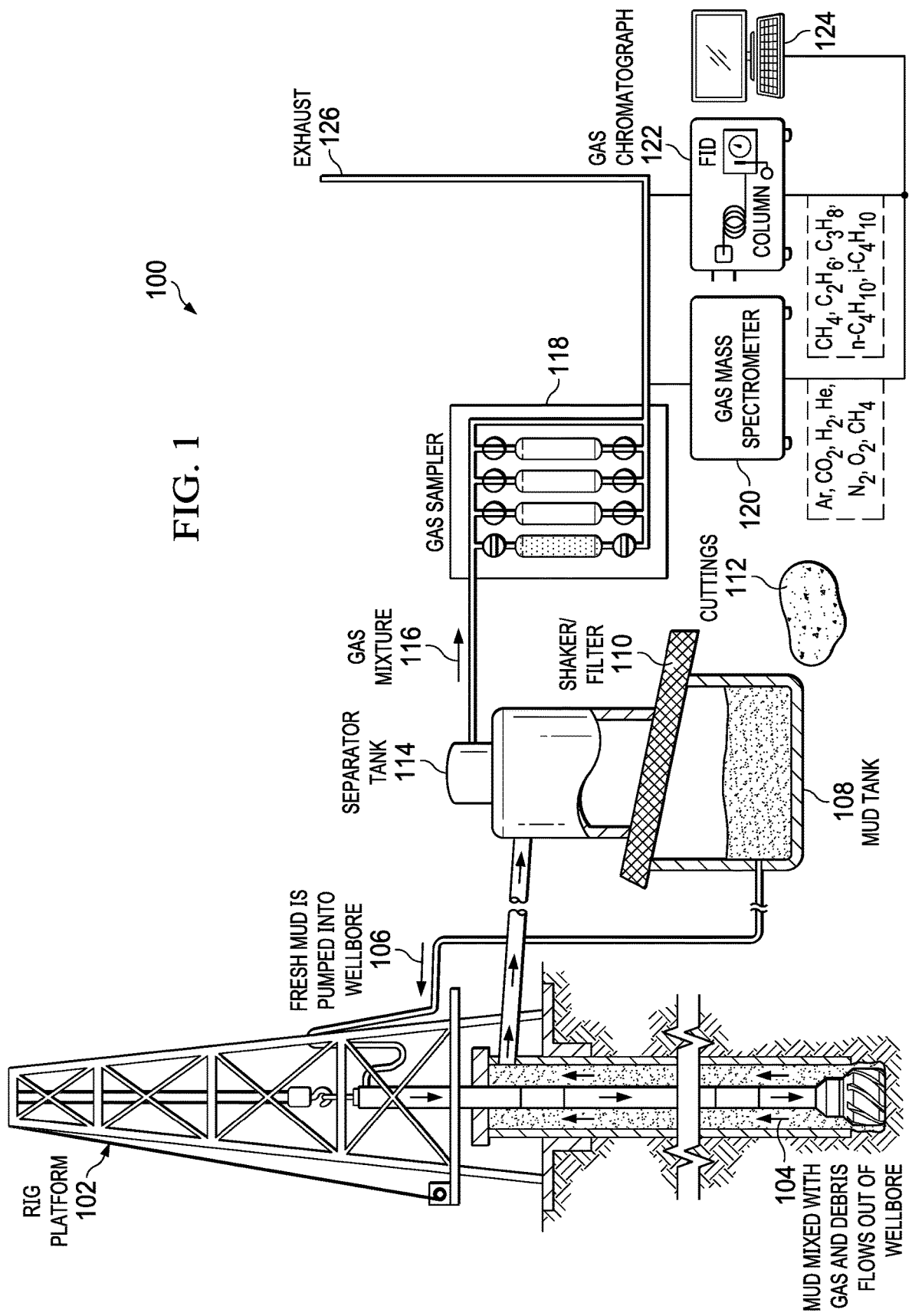
FIG. 1 is a diagram of an example of a conventional mud gas measurement system, according to some implementations of the present disclosure.

The following detailed description describes techniques for estimating reservoir porosity from mud gas data while drilling. Both light (basic) and heavy (advanced) gas measurements can be measured while drilling and used with machine learning (ML) techniques to establish a nonlinear relationship to estimate reservoir porosity in real time while drilling. The term real time can correspond, for example, to events that occur within a specified period of time, such as within a few seconds or minutes.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The estimation of reservoir porosity from mud gas data can be a useful tool used to determine reservoir quality at early stages during borehole development. Conventional techniques that include logging while drilling (LWD) or measurement while drilling (MWD) can be expensive. Waiting up to six months, for example, to obtain logging data can result in corresponding degrees of cost. Using techniques of the present disclosure can help to extend the utility of mud gas data beyond current practices that include reservoir fluid typing in pseudo (or indirect) generation of petrophysical logs. Using techniques of the present disclosure can ultimately reduce the cost of logging.

Conventional techniques lack the identification and use of physical relationships between gases and reservoir quality measures. Techniques of the present disclosure include methodologies that make it possible to estimate porosity during drilling using mud gas data. Mud gas data of existing wells can be used to build a model powered by ML methodologies that establish nonlinear relationships with corresponding porosity logs. While drilling, model can use mud gas measurements as input to estimate and generate a porosity log in real time. Instead of waiting for up to three months, the generated porosity log can be used to determine the quality of the well as drilling progresses.

While focus in the petrochemical drilling industry is currently shifting from qualitative geological characterization to quantitative in the petroleum industry, techniques of the present disclosure can be used to relate mud gas data with reservoir porosity. Generating a porosity log during drilling and ahead of the logging process can positively impact the reservoir quality evaluation process by saving time and cost. Ability to make reservoir management decisions at the early stage of development is a big advantage. ML techniques can be applied to adequately handle the nonlinearity and the embedded noise in mud gas data for the estimation and generation of porosity log while drilling.

FIG. 1 is a diagram of an example of a conventional mud gas measurement system 100, according to some implementations of the present disclosure. The system 100 includes a rig platform 102 used when drilling a well, for example, an oil well. During drilling, mud 104 mixed with gas and debris flows out of the wellbore of the well. While drilling occurs, fresh mud 106 is pumped into the wellbore. The fresh mud 106 can be pumped from a mud tank 108 that contains mud filtered using a shaker/filter 110. Cuttings 112, including rock from the wellbore, can also be separated by the shaker/filter 110. A separator tank 114 can separate a gas mixture 116 from mud that flows from the wellbore, while providing mud to the shaker/filter 110. The gas mixture 116 can be sampled by a gas sampler 118. A gas mass spectrometer 120 and a gas chromatograph 122 can be used to analyze the gas. Results can be provided to a user through a user interface 124. Remaining unused gas can exit the system 100 as exhaust 126.

The proposed methodology is based on ML approaches that establish nonlinear relationships between available mud gas data and porosity from previously-drilled wells. The present disclosure extends the utility of the gas measurements to estimate reservoir porosity as a log by building a gas-porosity database from the abundant data obtained from previously-drilled wells. ML technologies can be employed to generate a continuous porosity profile for a new well being drilled. An integrated gas-porosity database can be used to build and calibrate ML models. Trained ML models can then be used to generate a continuous porosity log for a new well. The ability to generate porosity ahead of a conventional logging process can be a big benefit to reservoir management and field development processes.

Figure 2:
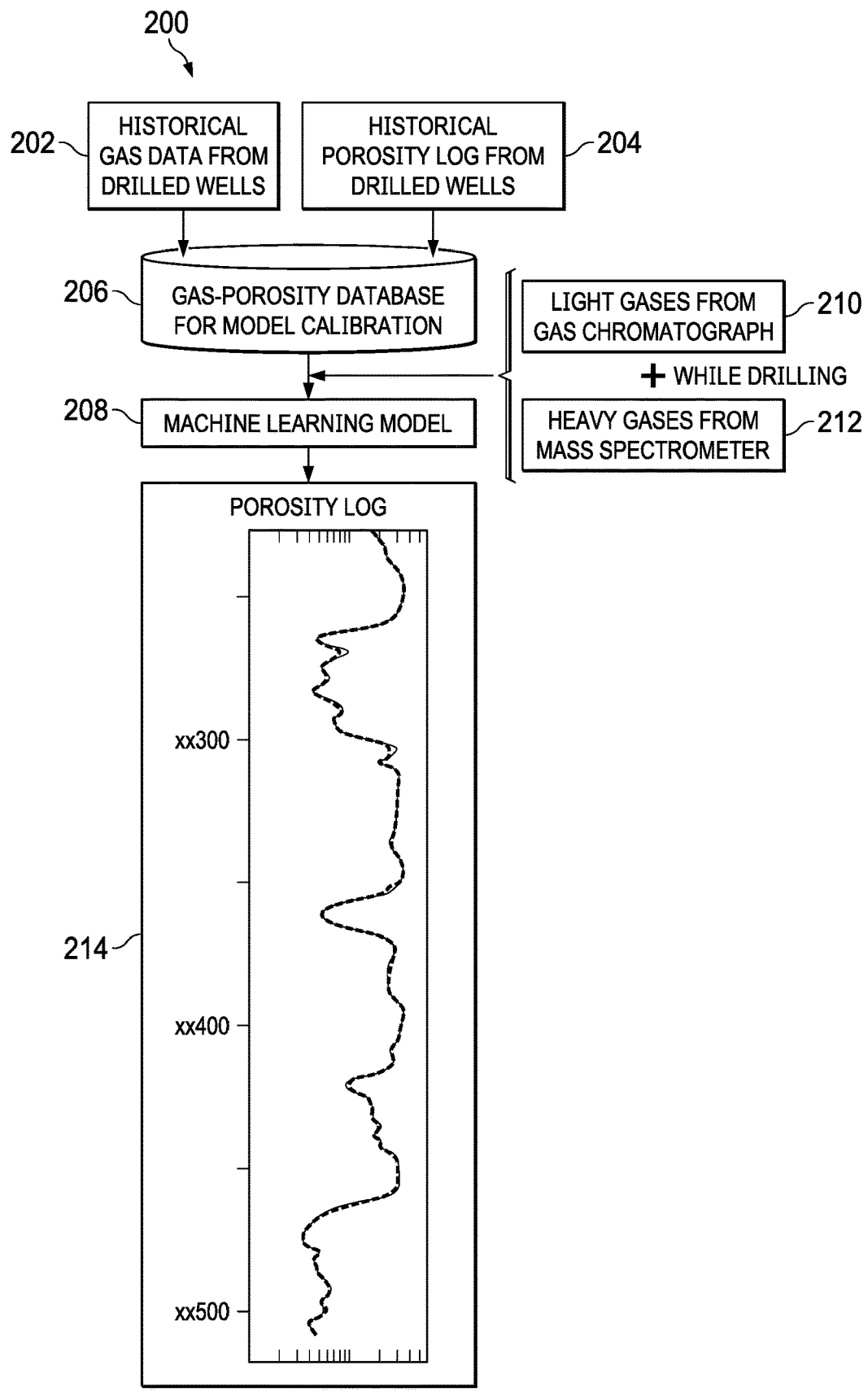
FIG. 2 is a flow diagram of an example of a workflow for generating a porosity log while drilling, according to some implementations of the present disclosure.

FIG. 2 is a flow diagram of an example of a workflow 200 for generating a porosity log while drilling, according to some implementations of the present disclosure. At 202, historical gas data is received from drilled wells. At 204, porosity log data is received from drilled wells. At 206, the received data can be combined into a gas-porosity database used for model calibration and used in a machine learning model 208.

Figure 3:
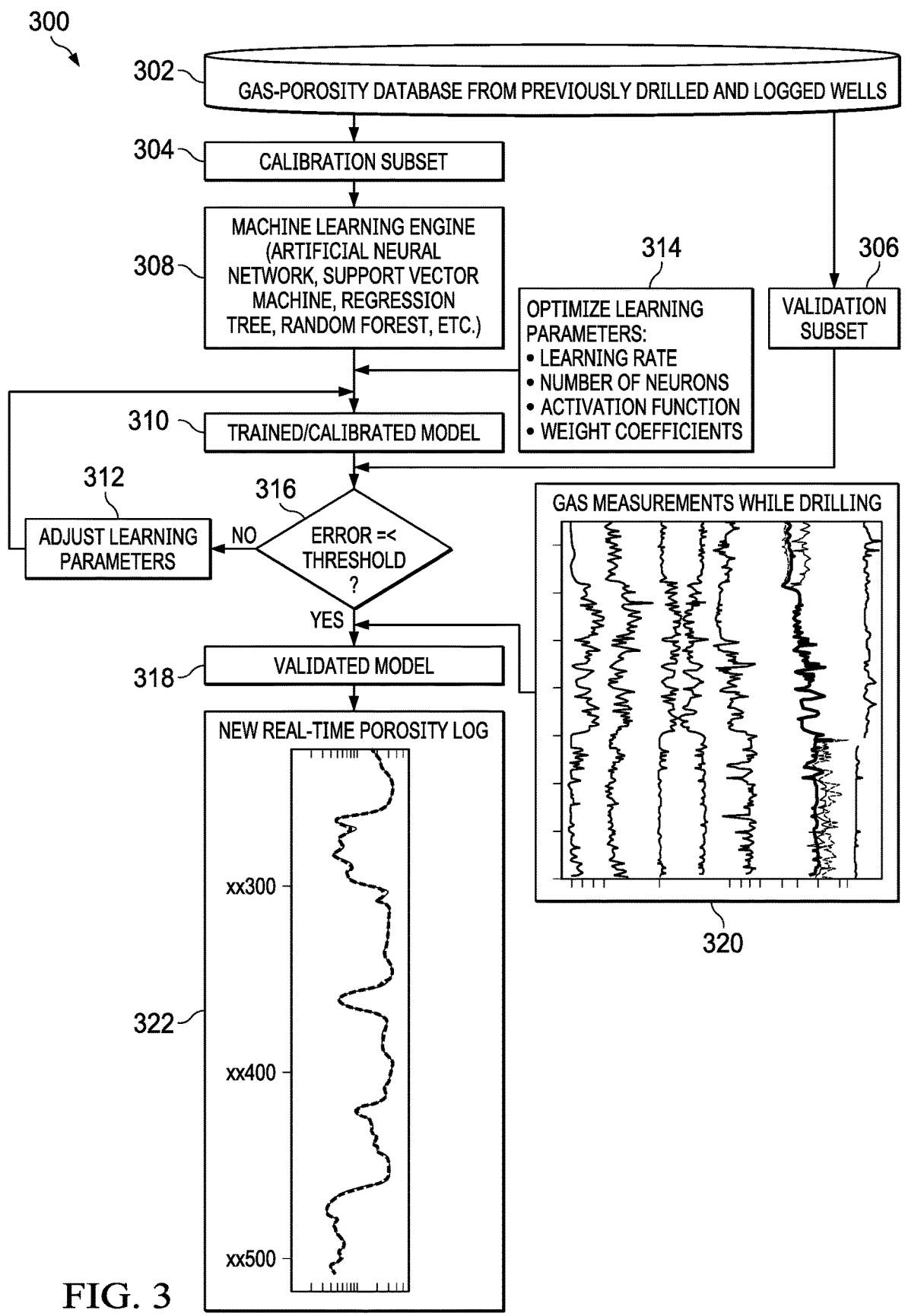
FIG. 3 is a flow diagram showing an example of a workflow for a machine learning model, according to some implementations of the present disclosure.

Processes involved in using the ML model 208 that can be used in the workflow 200 are further illustrated in FIG. 3. ML models can perform techniques such as Artificial Neural Network (ANN), Support Vector Machine (SVM), Regression Tree (RT), Random Forest (RF), Extreme Learning Machine (ELM), and Type I and Type II Fuzzy Logic (T1FL/T2FL). A gas-porosity database can be split to form two separate data subsets for calibration and validation that are used, respectively, to build and optimize the ML engine. For example, optimization can refer to achieving ML engine results that indicate a performance greater than a predefined threshold. The optimization process can involve adjusting appropriate parameters, such as the learning rate, number of neurons, activation function, and weight coefficients, to their optimal values. In this way, the error between the model prediction and the actual porosity estimations from the validation data subset can be kept within a pre-set threshold. If the error is within the threshold, the model can be considered optimized and can receive real-time gas measurements from a new well without the need for logging to predict the porosity log profile for the entire well. Otherwise, the learning parameters can be re-adjusted. This process of matching the model prediction with the action validation data can be referred to as a feed-forward process. The process of re-adjusting the model parameters to increase the match and reduce the error between the model prediction and the actual validation measurements can be referred to as a back-propagation. It can be noted that these feed-forward and back-propagation processes have the capability to remove the bias embedded in the original thin section analysis. The iteration can continue until the error comes within the threshold or a maximum number of iterations is reached. The best model at that point is used for the prediction.

Further description of step 208 in FIG. 2 is presented in FIG. 3. The machine learning model can use techniques such as ANN, support vector machine, radial basis function, fuzzy logic, or decision tree. The description that follows applies specifically to ANN. The steps involved in typical ML technique can include, for example, training/calibration, validation, and prediction. Gas measurements obtained from already drilled wells can consist of light (basic) gases 210 and heavy (advanced) gases 212. The ML model 208 can use the gas-porosity database and the inputs 210 and 212 to generate a porosity log 214.

In some implementations, gas measurement data can be measured at the rate of 1.0-foot intervals. The gas data can be paired with their corresponding porosity logs for the same wells to build a gas-porosity calibration database. The database can typically be divided into two subsets: training/calibration and validation. The training/calibration subset can usually be much more than the validation, such as in the ratio 70:30, in which 70% goes for training and the remaining 30% is used for validation. The training/calibration data subset can be used to create a sophisticated nonlinear mathematical relationship between the gas data and the porosity log. This can be done by multiplying each mud gas log by a certain weight factor determined by the outcome of a nonlinear mapping using a pre-determined activation function. This weight factor, typically ranging from 0 to ±1, can be obtained from the degree of nonlinear correlation or significance between the gas and the porosity. A weighting process can be used to determine the effect that a gas measurement has on an overall relationship (now called the model).

In some implementations, a certain function, $f$ such as a sigmoid, can be used to transform the input space to a multi-dimensional nonlinear space to match the nature of the subsurface data. In a simplified form, a typical mathematical equation can be simplified as shown in Equation (1):

$$Y = f(a_1 X_1 + a_2 X_2 + \ldots + a_6 X_6) \quad (1)$$

where Y is the target variable (porosity in this case), $a_1 \ldots a_6$ are the weighting factors, $X_1$-$X_6$ are the input gas measurements, and $f$ is the activation function (such as Gaussian or sigmoid).

A Gaussian function can be in the form of Equation (2):

$$f(x) = e^{-x^2} \quad (2)$$

where x is each of the input wireline logs.

A sigmoid function can be in the form of Equation (3):

$$f(x) = \frac{1}{1 + e^{-x}} \quad (3)$$

where x is each of the input wireline logs.

Parameters such as the number of layers and number of neurons in the hidden layer(s) are set to fit (or "tune") the nonlinear equation to the calibration data. The input part of the validation data subset (gas measurements) is passed to the model while keeping the target variable hidden. The model is used to estimate the corresponding target to the input gas measurements. The estimated target values can then be compared to the actual target values kept hidden from the model. If the residual is more than a certain threshold, then the parameters can be changed and the entire process can be repeated. The cycle can continue until the residual is within the defined threshold. At this point, it can be said that a "trained" model exists that is ready for automated estimation of grain size for a new well. The prediction process can involve porting the gas measurements for a new well being drilled to the trained model (the calibrated mathematical equation) to estimate and generate a new porosity log. The validated model can process the gas measurements as input and generate predictions from a log of porosity in the same depth interval as the gas measurements. Model re-calibration can also optionally occur. When new or additional data (gas measurements and their corresponding porosity log from newly-drilled and logged wells) is available, the new or additional data can be added to the calibration database. With the updated calibrated database, the same set of tuning parameters may no longer be adequate to fit the model to the newly-updated data. As needed, new sets of the tuning parameters can be derived to establish a good fit between the updated gas measurements and the new set of porosity logs.

FIG. 3 is a flow diagram showing an example of a workflow 300 for a machine learning model, according to some implementations of the present disclosure. The machine learning model corresponds to the gas-porosity model that is trained and calibrated using techniques of the present disclosure. At 302, a gas-porosity database from previously-drilled and logged wells can be divided into a calibration subset 304 and a validation subset 306. A machine learning engine 308 can use the calibration subset 304 to create a trained/calibrated model 310. Other inputs can include optimized learning parameters 314 (for example, including a learning rate, a number of neurons, an activation function, and weighting coefficients). At 316, a determination can be made whether an error associated with the trained/calibrated model 310 is within a threshold. If not, learning parameters 312 are adjusted to update the trained/calibrated model 310. If the error associated with the trained/calibrated model 310 is within a threshold, then a validated model 318 uses gas measurements while drilling 320 to generate a real-time porosity log 322.

Figure 4A:
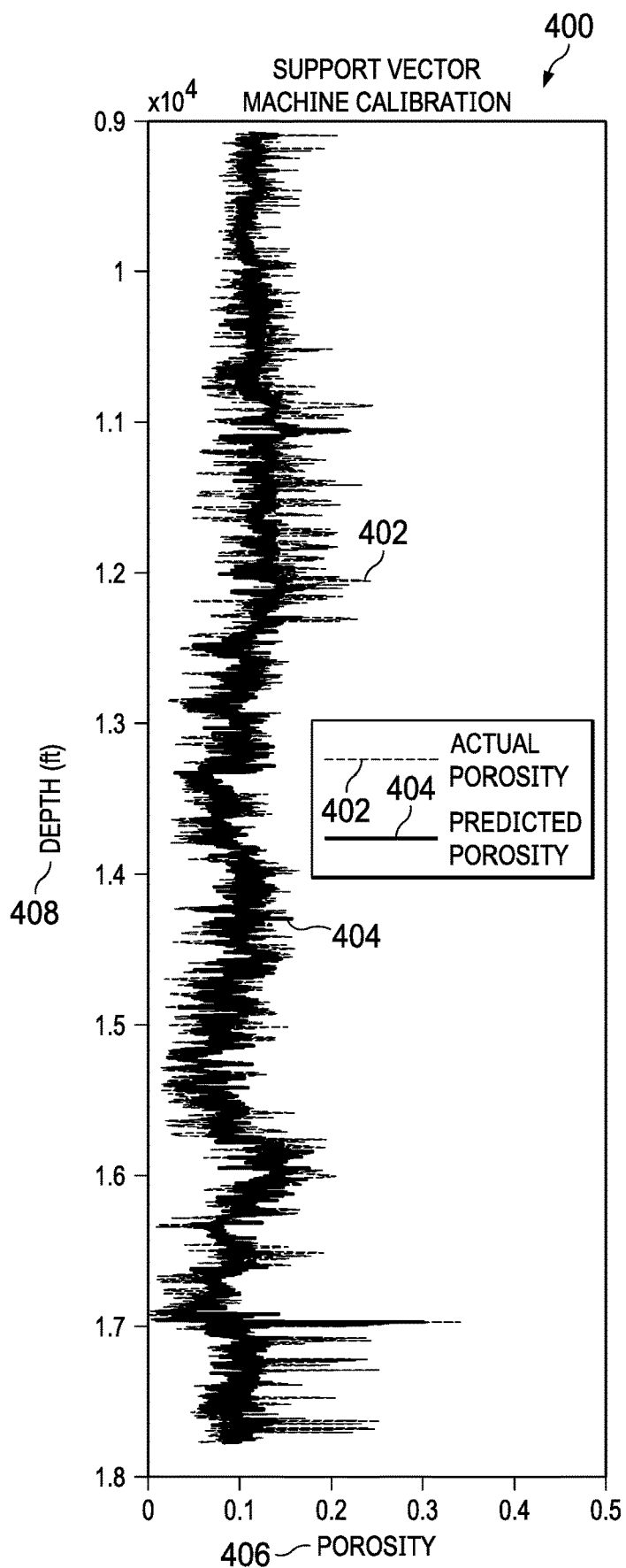
FIG. 4A is a diagram showing an example of a calibration plot, according to some implementations of the present disclosure.

FIG. 4A is a diagram showing an example of a calibration plot 400, according to some implementations of the present disclosure. The calibration plot 400 can be a support vector machine (SVM) calibration plot, for example. Actual porosity 402 and predicted porosity 404 are plotted relative to porosity 406 and depth 408, for example, in feet (ft).

Figure 4B:
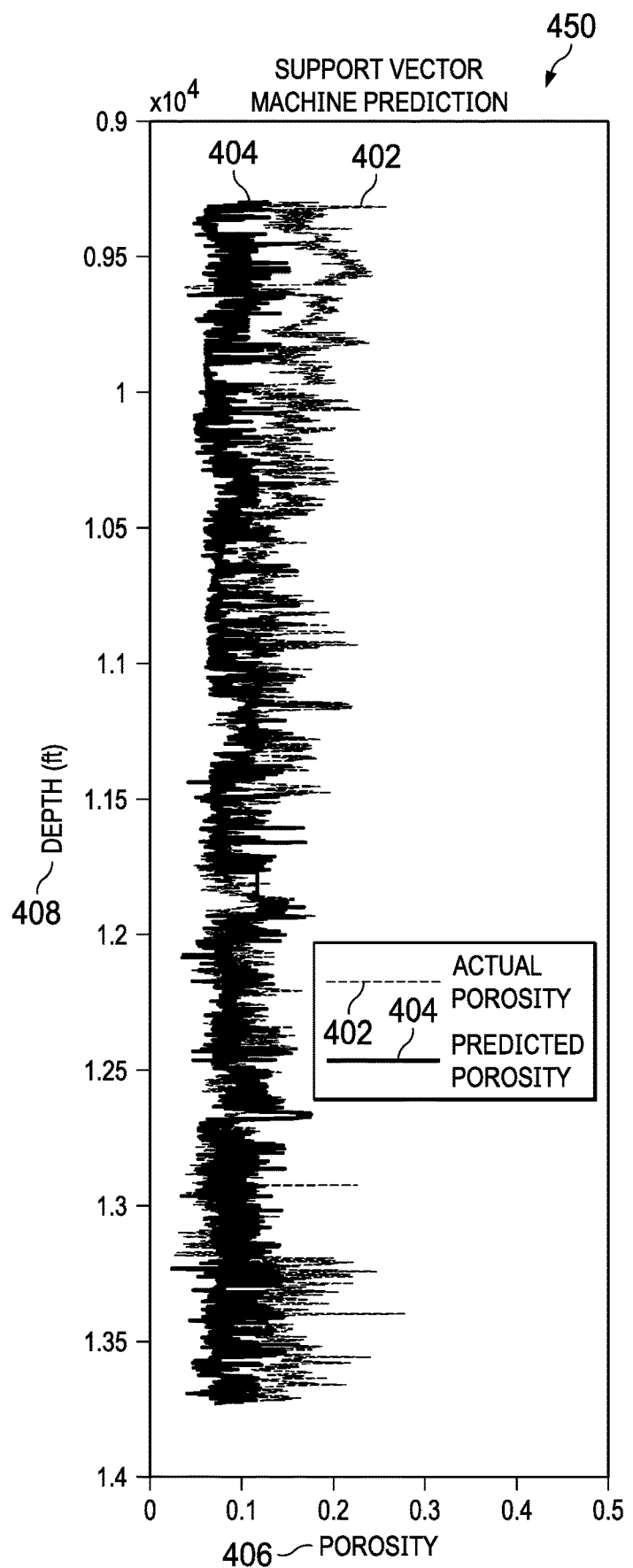
FIG. 4B is a diagram showing an example of a prediction plot, according to some implementations of the present disclosure.

FIG. 4B is a diagram showing an example of a prediction plot 450, according to some implementations of the present disclosure. The prediction plot 450 can be a support vector machine (SVM) prediction plot, for example. Actual porosity 402 and predicted porosity 404 are plotted relative to porosity 406 and depth 408.

FIGS. 4A and 4B show examples of results that were obtained using tests conducted for model testing, according to some implementations of the present disclosure. FIG. 4A shows the model calibration result, which is the result of the model when tested on the same data used to calibrate the model. FIG. 4B shows the performance of the model when tested on well data that was not included in the calibration. The porosity log can be generated by porting gas measurements from a new well being drilled to the calibrated model.

Figure 5:
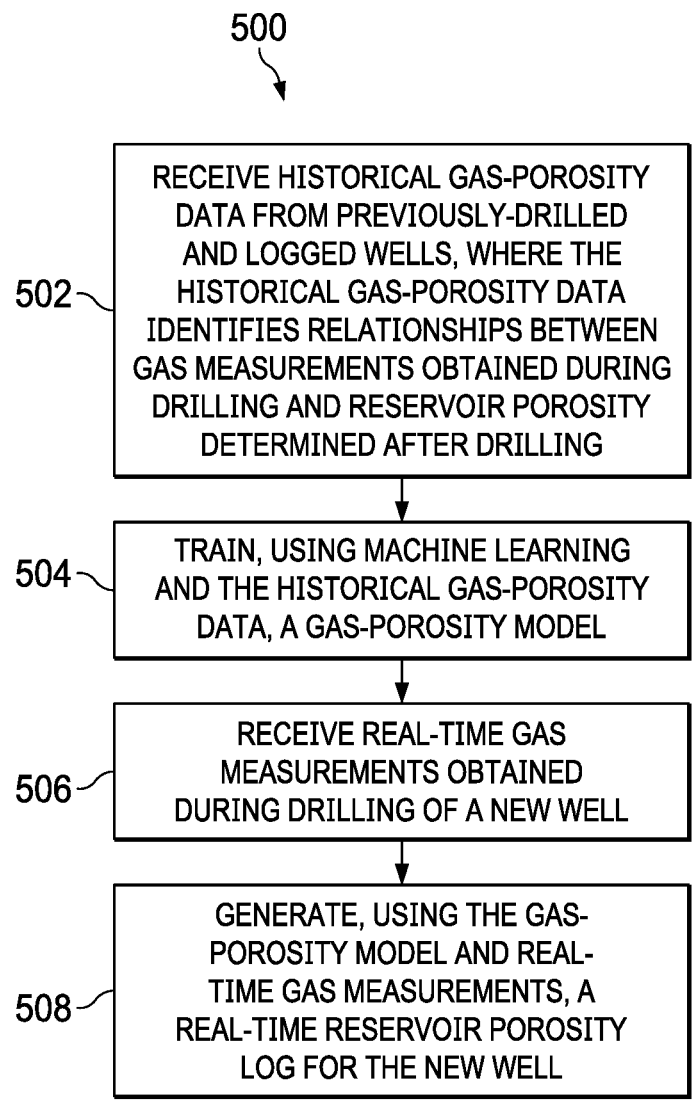
FIG. 5 is a flowchart of an example of a method for estimating reservoir porosity from mud gas data while drilling, according to some implementations of the present disclosure.

FIG. 5 is a flowchart of an example of a method 500 for estimating reservoir porosity from mud gas data while drilling, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, historical gas-porosity data is received from previously-drilled and logged wells. The gas-porosity data identifies relationships between gas measurements obtained during drilling and reservoir porosity determined after drilling. As an example, the historical gas-porosity data associated with multiple rig platforms 102 can be received, including the results from each rig's gas mass spectrometer 120 and gas chromatograph 122. The corresponding reservoir porosity determined after drilling for each rig can also be received. From 502, method 500 proceeds to 504.

At 504, a gas-porosity model is trained using machine learning and the historical gas-porosity data. The machine learning can be performed using techniques of one or more of ANN, SVM, RT, RF, ELM, and T1FL/T2FL. From 504, method 500 proceeds to 506.

At 506, real-time gas measurements are obtained during drilling of a new well. The real time gas measurements for the new rig can include the results from the gas mass spectrometer 120 and gas chromatograph 122 of the new rig.

In some implementations, method 500 can further include determining whether the gas-porosity model meets an error threshold. Upon determining that the gas-porosity model does not meet the error threshold, learning parameters used in the machine learning are adjusted, and the gas-porosity model is calibrated based on the adjusted learning parameters. The learning parameters can include, for example, a learning rate, a number of neurons, an activation function, and weighting coefficients. In some implementations, the learning parameters can be optimized to reduce a number of iterations needed to train and calibrate the gas-porosity model. In some implementations, the weighting coefficients corresponding to inputs representing different gas measurements can be changed to generate different results in the machine learning. From 506, method 500 proceeds to 508.

At 508, a real-time reservoir porosity log is generated for the new well using the gas-porosity model and real-time gas measurements. As an example, the real-time porosity log 322 can be generated for the new well.

In some implementations, method 500 can further include creating a calibration subset of the historical gas-porosity data and a validation subset of the historical gas-porosity data. Generating the gas-porosity model can include training the gas-porosity model using the calibration subset. After 508, method 500 can stop.

In some implementations, method 500 can be programmed as a toolbox used for real-time estimation of reservoir porosity during drilling. The toolbox can be installed on workstations used onsite and in a central location (such as an office).

In some implementations, improved results using method 500 can occur when certain quality control (QC) techniques are improved or met. For example, the techniques can include performing QC on mud gas data to remove all the effects of rate of penetration, hole size, oil-based mud, and cracking of drilling fluid.

Figure 6:
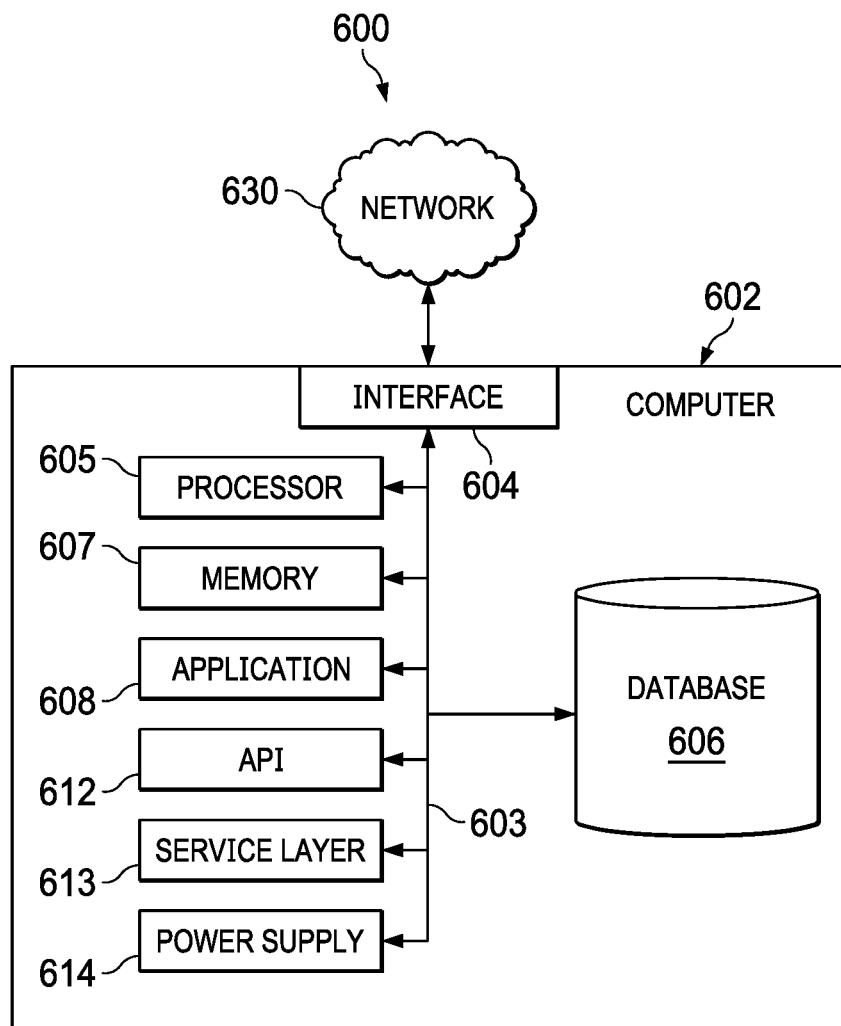
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. Historical gas-porosity data is received from previously-drilled and logged wells. The historical gas-porosity data identifies relationships between gas measurements obtained during drilling and reservoir porosity determined after drilling. A gas-porosity model is trained using machine learning and the historical gas-porosity data. Real-time gas measurements are obtained during drilling of a new well. A real-time reservoir porosity log is generated for the new well using the gas-porosity model and real-time gas measurements.

The foregoing and other described implementations can each, optionally, include one or more of the following features:

A first feature, combinable with any of the following features, the method further including creating a calibration subset of the historical gas-porosity data and a validation subset of the historical gas-porosity data, where generating the gas-porosity model includes training the gas-porosity model using the calibration subset.

A second feature, combinable with any of the previous or following features, the method further including: determining whether the gas-porosity model meets an error threshold; and upon determining that the gas-porosity model does not meet the error threshold: adjusting learning parameters used in the machine learning; and calibrating the gas-porosity model based on the adjusting.

A third feature, combinable with any of the previous or following features, where the learning parameters include a learning rate, a number of neurons, an activation function, and weighting coefficients.

A fourth feature, combinable with any of the previous or following features, the method further including optimizing the learning parameters to reduce a number of iterations needed to calibrate the gas-porosity model.

A fifth feature, combinable with any of the previous or following features, where the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

A sixth feature, combinable with any of the previous or following features, the method further including changing the weighting coefficients corresponding to inputs representing different gas measurements to generate different results in the machine learning.

In a second implementation, a non-transitory, computer-readable medium stores one or more instructions executable by a computer system to perform operations including the following. Historical gas-porosity data is received from previously-drilled and logged wells. The historical gas-porosity data identifies relationships between gas measurements obtained during drilling and reservoir porosity determined after drilling. A gas-porosity model is trained using machine learning and the historical gas-porosity data. Real-time gas measurements are obtained during drilling of a new well. A real-time reservoir porosity log is generated for the new well using the gas-porosity model and real-time gas measurements.

The foregoing and other described implementations can each, optionally, include one or more of the following features:

A first feature, combinable with any of the following features, the operations further including creating a calibration subset of the historical gas-porosity data and a validation subset of the historical gas-porosity data, where generating the gas-porosity model includes training the gas-porosity model using the calibration subset.

A second feature, combinable with any of the previous or following features, the operations further including: determining whether the gas-porosity model meets an error threshold; and upon determining that the gas-porosity model does not meet the error threshold: adjusting learning parameters used in the machine learning; and calibrating the gas-porosity model based on the adjusting.

A third feature, combinable with any of the previous or following features, where the learning parameters include a learning rate, a number of neurons, an activation function, and weighting coefficients.

A fourth feature, combinable with any of the previous or following features, the operations further including optimizing the learning parameters to reduce a number of iterations needed to calibrate the gas-porosity model.

A fifth feature, combinable with any of the previous or following features, where the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

A sixth feature, combinable with any of the previous or following features, the operations further including changing the weighting coefficients corresponding to inputs representing different gas measurements to generate different results in the machine learning.

In a third implementation, a computer-implemented system includes a database containing historical gas measurement information and reservoir porosity information for plural wells; machine learning algorithms configured to generate gas-porosity models using machine learning and the database; and one or more processors and a non-transitory computer-readable storage medium coupled to the one or more processors and storing programming instructions for execution by the one or more processors. The programming instructions instruct the one or more processors to perform operations of the machine learning algorithms including the following. Historical gas-porosity data is received from previously-drilled and logged wells. The historical gas-porosity data identifies relationships between gas measurements obtained during drilling and reservoir porosity determined after drilling. A gas-porosity model is trained using machine learning and the historical gas-porosity data. Real-time gas measurements are obtained during drilling of a new well. A real-time reservoir porosity log is generated for the new well using the gas-porosity model and real-time gas measurements.

The foregoing and other described implementations can each, optionally, include one or more of the following features:

A first feature, combinable with any of the following features, the operations further including creating a calibration subset of the historical gas-porosity data and a validation subset of the historical gas-porosity data, where generating the gas-porosity model includes training the gas-porosity model using the calibration subset.

A second feature, combinable with any of the previous or following features, the operations further including: determining whether the gas-porosity model meets an error threshold; and upon determining that the gas-porosity model does not meet the error threshold: adjusting learning parameters used in the machine learning; and calibrating the gas-porosity model based on the adjusting.

A third feature, combinable with any of the previous or following features, where the learning parameters include a learning rate, a number of neurons, an activation function, and weighting coefficients.

A fourth feature, combinable with any of the previous or following features, the operations further including optimizing the learning parameters to reduce a number of iterations needed to calibrate the gas-porosity model.

A fifth feature, combinable with any of the previous or following features, where the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
  receiving historical gas-porosity data from previously-drilled and logged wells, wherein the historical gas-porosity data identifies relationships between gas measurements obtained during drilling and reservoir porosity determined after drilling;
  training, using machine learning and the historical gas-porosity data, a gas-porosity model;

receiving real-time gas measurements obtained during drilling of a new well, wherein the real-time gas measurements include both light (basic) and heavy (advanced) gas measurements; and generating, using the gas-porosity model and real-time gas measurements, a real-time reservoir porosity log for the new well, including:

employing machine learning techniques to build nonlinear relationships between the light (basic) and heavy (advanced) gas measurements and corresponding porosity values; and estimating reservoir porosity using the nonlinear relationships between the light (basic) and heavy (advanced) gas measurements and their corresponding porosity values.

2. The computer-implemented method of claim 1, further comprising creating a calibration subset of the historical gas-porosity data and a validation subset of the historical gas-porosity data, wherein generating the gas-porosity model includes training the gas-porosity model using the calibration subset.

3. The computer-implemented method of claim 2, further comprising:

determining whether the gas-porosity model meets an error threshold; and upon determining that the gas-porosity model does not meet the error threshold:

adjusting learning parameters used in the machine learning; and calibrating the gas-porosity model based on the adjusting.

4. The computer-implemented method of claim 3, wherein the learning parameters include a learning rate, a number of neurons, an activation function, and weighting coefficients.

5. The computer-implemented method of claim 3, further comprising optimizing the learning parameters to reduce a number of iterations needed to calibrate the gas-porosity model.

6. The computer-implemented method of claim 1, wherein the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

7. The computer-implemented method of claim 4, further comprising changing the weighting coefficients corresponding to inputs representing different gas measurements to generate different results in the machine learning.

8. A non-transitory, computer-readable medium storing one or more instructions executable by a computer system to perform operations comprising:

receiving historical gas-porosity data from previously-drilled and logged wells, wherein the historical gas-porosity data identifies relationships between gas measurements obtained during drilling and reservoir porosity determined after drilling;

training, using machine learning and the historical gas-porosity data, a gas-porosity model;

receiving real-time gas measurements obtained during drilling of a new well, wherein the real-time gas measurements include both light (basic) and heavy (advanced) gas measurements; and generating, using the gas-porosity model and real-time gas measurements, a real-time reservoir porosity log for the new well, including:

employing machine learning techniques to build nonlinear relationships between the light (basic) and heavy (advanced) gas measurements and corresponding porosity values; and estimating reservoir porosity using the nonlinear relationships between the light (basic) and heavy (advanced) gas measurements and their corresponding porosity values.

9. The non-transitory, computer-readable medium of claim 8, the operations further comprising creating a calibration subset of the historical gas-porosity data and a validation subset of the historical gas-porosity data, wherein generating the gas-porosity model includes training the gas-porosity model using the calibration subset.

10. The non-transitory, computer-readable medium of claim 9, the operations further comprising:

determining whether the gas-porosity model meets an error threshold; and upon determining that the gas-porosity model does not meet the error threshold:

adjusting learning parameters used in the machine learning; and calibrating the gas-porosity model based on the adjusting.

11. The non-transitory, computer-readable medium of claim 10, wherein the learning parameters include a learning rate, a number of neurons, an activation function, and weighting coefficients.

12. The non-transitory, computer-readable medium of claim 10, the operations further comprising optimizing the learning parameters to reduce a number of iterations needed to calibrate the gas-porosity model.

13. The non-transitory, computer-readable medium of claim 8, wherein the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

14. The non-transitory, computer-readable medium of claim 11, the operations further comprising changing the weighting coefficients corresponding to inputs representing different gas measurements to generate different results in the machine learning.

15. A computer-implemented system, comprising:

a database containing historical gas measurement information and reservoir porosity information for plural wells;

machine learning algorithms configured to generate gas-porosity models using machine learning and the database;

one or more processors; and a non-transitory computer-readable storage medium coupled to the one or more processors and storing programming instructions for execution by the one or more processors, the programming instructions instructing the one or more processors to perform operations of the machine learning algorithms comprising:

receiving historical gas-porosity data from previously-drilled and logged wells, wherein the historical gas-porosity data identifies relationships between gas measurements obtained during drilling and reservoir porosity determined after drilling;

training, using machine learning and the historical gas-porosity data, a gas-porosity model;

receiving real-time gas measurements obtained during drilling of a new well, wherein the real-time gas measurements include both light (basic) and heavy (advanced) gas measurements; and generating, using the gas-porosity model and real-time gas measurements, a real-time reservoir porosity log for the new well, including:
employing machine learning techniques to build nonlinear relationships between the light (basic) and heavy (advanced) gas measurements and corresponding porosity values; and
estimating reservoir porosity using the nonlinear relationships between the light (basic) and heavy (advanced) gas measurements and their corresponding porosity values.

16. The computer-implemented system of claim 15, the operations further comprising creating a calibration subset of the historical gas-porosity data and a validation subset of the historical gas-porosity data, wherein generating the gas-porosity model includes training the gas-porosity model using the calibration subset.

17. The computer-implemented system of claim 16, the operations further comprising:
determining whether the gas-porosity model meets an error threshold; and
upon determining that the gas-porosity model does not meet the error threshold:
adjusting learning parameters used in the machine learning; and
calibrating the gas-porosity model based on the adjusting.

18. The computer-implemented system of claim 17, wherein the learning parameters include a learning rate, a number of neurons, an activation function, and weighting coefficients.

19. The computer-implemented system of claim 17, the operations further comprising optimizing the learning parameters to reduce a number of iterations needed to calibrate the gas-porosity model.

20. The computer-implemented system of claim 15, wherein the machine learning is performed using techniques including one or more of Artificial Neural Network (ANN), Support Vector Machine (SVM), Regression Tree (RT), Random Forest (RF), Extreme Learning Machine (ELM), and Type I and Type II Fuzzy Logic (T1FL/T2FL).

* * * * *